United States Patent [19]

Kamphuis et al.

[11] Patent Number: 5,362,398
[45] Date of Patent: Nov. 8, 1994

[54] PROCESS FOR THE PREPARATION AND PURIFICATION OF A HYDROXYLAMMONIUM SALT SOLUTION

[75] Inventors: Carolus H. M. Kamphuis, Born; Hendrikus J. H. Rouhof, Sittard, both of Netherlands

[73] Assignee: D.S.M. N.V., Heerlen, Netherlands

[21] Appl. No.: 84,171

[22] Filed: Jul. 1, 1993

[30] Foreign Application Priority Data

Jul. 2, 1992 [NL] Netherlands ......................... 9201176

[51] Int. Cl.$^5$ .............................................. B01D 61/00
[52] U.S. Cl. .................................... 210/651; 210/650; 210/653
[58] Field of Search ................ 210/650, 651, 653, 734, 210/638; 549/370; 423/387

[56] References Cited

U.S. PATENT DOCUMENTS

| | | | |
|---|---|---|---|
| 3,940,442 | 2/1976 | de Rooij | 423/387 |
| 4,081,516 | 3/1978 | Scholten et al. | 210/734 |
| 4,414,401 | 11/1983 | Wintermeyer et al. | 549/370 |
| 4,851,125 | 7/1989 | Dotson et al. | 210/651 |

FOREIGN PATENT DOCUMENTS 834556 12/1976 Belgium .
1134963 9/1980 United Kingdom .

Primary Examiner—Robert A. Dawson
Assistant Examiner—Ana M. Fortuna
Attorney, Agent, or Firm—Cushman, Darby & Cushman

[57] ABSTRACT

The invention relates to a process for the preparation and purification of a hydroxylammonium salt solution, wherein the hydroxylammonium salt solution is separated by filtration from an aqueous reaction mixture, containing solid catalyst particles among other things, the filtration technique applied being a crossflow filtration technique, the pore diameter of the filter medium being 0.01-10 μm and the catalyst particles having an average size of 0.1-25 μm.

12 Claims, No Drawings

PROCESS FOR THE PREPARATION AND PURIFICATION OF A HYDROXYLAMMONIUM SALT SOLUTION

The invention relates to a process for the preparation and purification of a hydroxylammonium salt solution, wherein the hydroxylammonium salt solution is separated by filtration from an aqueous reaction mixture, containing solid catalyst particles among other things.

As is known, an important application of hydroxylammonium salts is the preparation of oximes from ketones or aldehydes, in particular the preparation of cyclohexanone oxime from cyclohexanone. For this preparation of an oxime a cyclic process is known wherein an acid-buffered reaction medium is kept in circulation via a hydroxylammonium salt synthesis zone and an oxime synthesis zone. The reaction medium is acid-buffered by means of for instance phosphoric acid and/or hydrogen sulphate and the buffer salts derived from these acids. In the hydroxylammonium salt synthesis zone nitrate ions or nitrogen oxides are converted with hydrogen to hydroxyl-amine. The hydroxylamine reacts with the free buffer acid to form the corresponding hydroxylammonium salt, which is then transported to the oxime synthesis zone, where the hydroxylammonium salt reacts with a ketone to form the corresponding oxime, with release of acid. After separation of the oxime from the reaction medium, the reaction medium is returned to the hydroxylammonium salt synthesis zone, after fresh nitrate ions or nitrogen oxides have been added to the reaction medium.

If the hydroxylammonium salt synthesis starts from a solution of phosphoric acid and nitrate, the chemical reactions mentioned above are represented as follows:

1) Preparation of the hydroxylammonium salt:

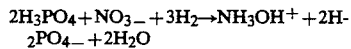

2) Preparation of the oxime:

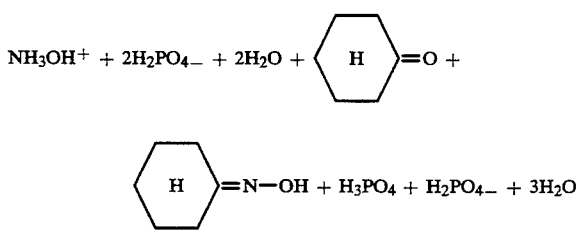

3) Supply of $HNO_3$ to make up the depletion of nitrate ions after removal of the oxime formed:

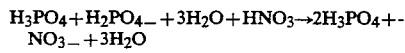

The reaction is catalyzed heterogeneously. The catalyst applied in the preparation of the hydroxylammonium salt mostly consists of a metal from the platinum metal group, for instance Pd or Pd+Pt, as active component on a carrier material such as carbon. Further, minor quantities of other components can be added as activator. Possible components are Cu, Ag, Cd, Hg, Ga, In, Tl, Ge, Sn, Pb, As, Sb and Bi.

It is known that with a Pd+Pt-on-carbon catalyst a high activity and a reasonable selectivity regarding the reaction of nitrate to hydroxylammonium salt are achieved. With a Pd-on-carbon catalyst a higher selectivity concerning the hydroxylammonium salt synthesis is achieved. But under comparable conditions the activity achieved with this catalyst is lower, so that mostly a Pd+Pt-on-carbon catalyst is preferred. The average particle size of the catalyst is in practice between 10 $\mu$m and 50 $\mu$m. The term 'average particle size' is understood to mean that 50 vol. % of the particles is larger than the specified diameter.

The preparation of the hydroxylammonium salt can take place in a device as described in NL-A-6908934. In the embodiment as described in said patent the reaction mixture leaving the hydroxylammonium salt synthesis zone is filtered, part of the dissolved hydroxylammonium salt being separated off and the remaining solution, including the catalyst, being returned to the hydroxylammonium salt synthesis zone. In a normal filtering procedure a layer of catalyst (filter cake) will be deposited on the filter material. Effective functioning of such a filter even requires the formation of a filter cake. However, the filter cake must not be allowed to become too thick as otherwise the filtrate flux is restricted too much and because in the filter cake in the absence of hydrogen decomposition of the desired product can occur. The filter cake will therefore have to be removed regularly. Removal of filter cake, for instance by backwashing, is laborious and is disturbing in a continuously operated process.

Apart from the filtration problem indicated above, it is desirable to improve the activity and selectivity achieved with the catalyst.

The object of the invention is to provide a process with an improved activity and selectivity of the reaction whereby nitrate or nitrogen oxides, respectively, is/are converted to the hydroxylammonium salt, and a process with an improved filtration.

This object is accomplished due to employment of a crossflow filtration technique, with the pore diameter of the filter medium between 0.01 and 10 $\mu$m, and due to the catalyst particles having an average size of 0.1-25 $\mu$m.

By applying the process according to the invention it is possible to either use smaller catalyst particles or to use relatively big catalyst particles and a higher catalyst concentration while the filtration can be carried out in a simple manner.

Crossflow filtration is a technique in which the solution to be purified flows parallel along the filter medium. The filtrate passes the filter medium without or almost without causing a filter cake to be formed because the solid particles are swept off the filter medium by the flow of the solution to be purified. As no filter cake is formed, the said drawbacks of ordinary filtration are avoided.

The filtration technique which is equal to a process according to the invention is known as the 'crossflow microfiltration technique'.

In patent publication GB 1134963 a process is described wherein the hydroxylammonium salt solution is separated by crossflow filtration from an aqueous solution which among other things contains catalyst particles. However, that patent publication describes a filter medium with a pore diameter of 90 $\mu$m, which is used to filter a relatively dilute mixture of 0.005 gram of catalyst particles per gram reaction mixture. This filter medium therefore is not quite suitable for the present process, in which particles smaller than 25 $\mu$m are used and in which usually higher catalyst concentrations are used. Especially while the process of GB 1134963 is started up and during the usual backwashing, more catalyst particles will get into the filtrate than in a process according to the invention. It is surprising that the filter capacity of the filter according to the invention is higher than the flux of the example of GB 1134963, while applying almost the same pressure drop, smaller catalyst particles and a higher catalyst concentration than GB 1134963.

EP-A-52719 describes a cross flow filtration process for filtering a reaction mixture containing Pd catalyst and Pd-on-coal catalyst, while applying a polypropylene filter and a polysulfon filter. No mention is made of catalyst particle size. In the examples the flux either decreased during filtration or a high frequency of back flushing (every 1.5 minute) had to be applied to overcome this problem.

According to the invention the pore diameter of the filter medium is higher than 0.01 $\mu$m, preferably higher than 0.05 $\mu$m and with the most preferance higher than 0.1 $\mu$m. The pore diameter is smaller than 10 $\mu$m, preferably smaller than 5 $\mu$m and with the most preferance smaller than 3 $\mu$m.

The catalyst concentration is in general between 0.001 and 0.1 gram of catalyst per gram of reaction mixture. It is advantageous to use a high catalyst concentration because a high catalyst concentration can increase reactor capacity or allows the reaction temperature to be lowered while maintaining reactor capacity. A lower reaction temperature is advantageous because the selectivity of the reaction increases at lower temperatures. As a rule the temperature is 5°–10° C. lower than applied when using the relatively low catalyst concentration (<0.02 gram/gram). By applying the cross flow filtration technique according to the invention higher catalyst concentrations become possible. In case such high concentrations are applied in combination with conventional filtration techniques problems will occur during filtration. According to the present inventions preferably the catalyst concentration is higher than 0.005 gram catalyst per gram reaction mixture and with the most preference higher than 0.02 gram/gram.

In a first embodiment of the invention relatively small catalyst particles are applied which have an average size larger than 1 $\mu$m and preferably larger than 5 $\mu$m. The catalyst particles are smaller than 15 $\mu$m and with the most preferance smaller than 10 $\mu$m. The use of these small catalyst particles surprisingly appears to bring about an increase in the catalyst-induced activity and selectivity of the reaction of nitrate or nitrogen oxides, respectively, to hydroxylammonium salt.

In a second embodiment of the invention relatively large catalyst particles are applied which have an average size smaller than 25 $\mu$m and are as a rule larger than 15 $\mu$m. Catalyst particles of this size are known for processes according to the invention (see NL-A-7902291). By applying the process according to the invention it is possible to prepare hydroxylammonium salt with a relatively high catalyst concentration of higher than 0.02 gram catalyst per gram of reaction mixture without filtration problems:. The catalyst concentration is as a rule smaller than 0.1 gram catalyst per gram reaction mixture. By applying a higher catalyst concentration (0.02–0.1 gram/gram) it is possible to perform the preparation of hydroxylammonium salt at a lower temperature while maintaining the same reactor capacity. As explained before a lower reaction temperature enhances the selectivity of the reaction to hydroxylammonium salt.

Application of a process according to the invention enables the hydroxylammonium salt production capacity and/or selectivity of the reaction of an existing installation to be increased.

An additional advantage of application of the process according to the invention in an existing installation is that it permits replacing a Pd+Pt-on-carbon catalyst by a Pd-on-carbon catalyst with maintenance of the activity and an increase in selectivity.

Another additional advantage is that it has appeared that the filtration capacity under operating conditions of the filter medium is larger than that of the usual filter media with filter cake formation.

The catalyst for preparation of a hydroxylammonium salt solution is preferably a Pd-on-carbon or a Pd+Pt-on-carbon catalyst. The Pd-on-carbon catalyst in general has a Pd content of 1 to 25 wt. %, preferably 7 to 20 wt. %. The Pd+Pt-on-carbon catalyst in general has a Pd+Pt content of 1 to 20 wt. %, preferably 5 to 15 wt. %. The Pd:Pt weight ratio is in general between 1:1 and 10:1.

The temperature at which the filtration is carried out will in part depend on the temperature prevailing in the hydroxylammonium salt synthesis zone and in part on the thermal stability of the filter medium. The filtration is in general carried out at a temperature of 5°–100° C., preferably at 35°–65° C.

The pressure at which the filtration takes place, as well as the pressure difference, will depend on the process pressure prevailing in the hydroxylammonium salt synthesis zone. The pressure applied will in general be between 0.6 and 5 MPa, preferably between 2 and 3 MPa. The pressure difference across the filter medium will depend on the filter medium and the desired capacity of the filter. In general the pressure difference will be between 0.02 and 1.5 MPa, preferably between 0.05 and 0.5 MPa.

A crossflow filter can be designed in several ways. Possible types of design are a plate geometry, a tubular geometry or a convoluted geometry.

The filter medium can be composed of several layers. The filter medium will mostly be composed of two layers, one having a constructive function and the other being the actual filter. The pore diameter of the constructive layer is in general larger than the pore diameter of the filter layer. In the present patent application the pore diameter is always understood to be the pore diameter of the filter layer.

The filter medium is in general a microporous substance, which is chemically resistant to the reaction mixture. Examples of suitable microporous substances are for instance carbon, sintered metal, polymers and materials of ceramic origin, such as for instance $Al_2O_3$ and SiC. Preferred materials for the filter medium are anorganic materials such as for instance SiC, carbon and sintered metal.

The invention will be further elucidated by means of the following examples without being restricted thereto.

EXAMPLE I

A reaction mixture comprising per 3 kg of 0.21 kg $H_3PO_4$, 0.26 kg $NH_4H_2PO_4$, 0.22 kg $NH_3OH.H_2PO_4$, 0.27 kg $NH_4NO_3$ and 2.04 kg $H_2O$ and catalyst particles in suspension (0.026 gram catalyst particles per gram reaction mixture) was filtered in a laboratory cross flow unit. The remaining mixture containing the catalyst particles was recycled to the storage tank which contained the reaction mixture used in this experiment. The temperature was 50° C., the speed of the liquid through the cross flow pipes was 3 m/s and the pressure drop across the filter was 0.23 MPa. The cross flow filter was constructed of a hollow filter pipe with a 0.06 m diameter which was made of carbon. The pore diameter was 0.1 $\mu$m. The area of filtration medium was 0.15 m$^2$. The filtrate was recycled to the storage tank which contained the reaction mixture. The experiment could thus be performed in a continuously way in which the feedstock always had the same composition. Every 15 minutes the filter was back flushed during 2 seconds with clean filtrate. The experiment was conducted successfully during several hours without any problems. The filtration flux remained constant (0.9 m$^3$/m$^2$/hour) during the experiment and a clean filtrate was obtained.

EXAMPLE II

A solution consisting of 0.59 kg/h H$_3$PO$_4$, 0.44 kg/h NH$_4$NO$_3$, 1.97 kg/h H$_2$O and 0.10 kg/h H$_2$ was supplied to a reactor, provided with a cooling jacket and a stirrer, at a temperature of 55° C. and a pressure of 1 MPa. The residence time was 1 hour and the concentration of Pd-on-carbon catalyst was 26 g catalyst per liter of reaction mixture. The average particle size of the catalyst was 3 $\mu$m and the Pd content of the catalyst was 10 wt. %. Per hour, 0.21 kg H$_3$PO$_4$, 0.26 kg NH$_4$H$_2$PO$_4$, 0.22 kg NH$_3$OH.H$_2$PO$_4$, 2.07 kg NH$_4$NO$_3$ and 2.04 kg H$_2$O was extracted from the reactor via an analogous cross flow filtration as described in Example I.

Via the gas drain, 0.09 kg per hour of gaseous products was discharged, consisting mainly of hydrogen (0.087 kg) and for the rest of nitrogen and nitrogen oxides.

EXPERIMENT III

Experiment I was repeated with the reaction mixture comprising per 3 kg of 0.39 kg H$_3$PO$_4$, 0.14 kg NH$_4$H$_2$PO$_4$, 0.11 kg NH$_3$OH.H$_2$PO$_4$, 0.35 kg NH$_4$NO$_3$ and 2.01 kg H$_2$O and catalyst particles in suspension (0.026 gram catalyst particles per gram reaction mixture and a catalyst particle size of 23 $\mu$m). The filtration was conducted without any problems and a clean filtrate was obtained. The filtration flux remained constant (0.95 m$^3$/m$^2$/hour) during the experiment.

EXPERIMENT IV

Example II was repeated with in principle the same catalyst, but the average catalyst particle size was now 23 $\mu$m. The catalyst concentration and the Pd content were the same as in Example II.

Per hour, 0.39 kg H$_3$PO$_4$, 0.14 kg NH$_4$H$_2$PO$_4$, 0.11 kg NH$_3$OH.H$_2$PO$_4$, 0.35 kg NH$_4$NO$_3$ and 2.01 kg H$_2$O was extracted from the reactor via an analogous cross flow filtration as described in Example III. Via the gas drain, 0.094 kg per hour of gaseous products was discharged, consisting mainly of hydrogen (0.093 kg) and for the rest of nitrogen and nitrogen oxides.

We claim:

1. The process for the preparation and purification of a hydroxylammonium salt solution comprising separating a hydroxylammonium salt solution from an aqueous reaction mixture which contains catalyst particles having an average size of 0.1 to 25 $\mu$m by cross flow filtration with a filter medium to obtain a catalyst-containing residue and a filtrate containing hydroxyl ammonium salt wherein the pore diameter of the filter medium is 0.01 to 10 $\mu$m and the filtrate passes through said filter medium.

2. A process according to claim 1, wherein the filter medium has a pore diameter of 0.05 to 10 $\mu$m and the catalyst particles have an average particle size of 0.1 to 10 $\mu$m.

3. A process according to claim 1, wherein said reaction mixture the catalyst concentration is between 0.02–0.1 gram catalyst per gram reaction mixture.

4. A process according to claim 1, wherein the pore diameter of the filter medium is between 0.05 and 5 $\mu$m.

5. A process according to claim 1, wherein the catalyst is a pd-on-carbon catalyst.

6. A process according to claim 1, wherein the filter medium consists of a microporous substance.

7. A process according to claim 6, wherein said filter medium is a microporous substance which is chemically resistant to the reaction mixture and is selected from the group consisting of carbon, sintered metal, polymers and materials of ceramic origin.

8. A process according to claim 7, wherein the inorganic material is carbon, SiC, carbon or sintered metal.

9. A process according to claim 1 wherein the pore diameter of the filter medium is 0.05–5 $\mu$m, the catalyst particles have an average size of 15–25 $\mu$m, and the catalyst concentration in the reaction mixture is between 0.02–0.1 gram catalyst per gram reaction mixture.

10. A process according to claim 9, wherein the filter medium consists of a microporous substance wherein the filter medium is composed of carbon, sintered metal, a polymer or a material of ceramic origin.

11. A process according to claim 1, wherein the pore diameter of the filter medium is 0.05–5 $\mu$m and the catalyst particles have an average size of 1–15 $\mu$m.

12. A process according to claim 11, wherein the filter medium is a microporous substance composed of carbon, sintered metal, a polymer or a material of ceramic origin.

* * * * *